United States Patent
Ding et al.

(10) Patent No.: US 12,079,501 B2
(45) Date of Patent: Sep. 3, 2024

(54) MON SERVICE MIGRATION METHOD, APPARATUS, AND DEVICE, AND READABLE STORAGE MEDIUM

(71) Applicant: Inspur Electronic Information Industry Co., Ltd., Shandong (CN)

(72) Inventors: Chunjie Ding, Shandong (CN); Xiangrui Meng, Shandong (CN)

(73) Assignee: Inspur Electronic Information Industry Co., Ltd., Shandong (CN)

( * ) Notice: Subject to any disclaimer, the term of this patent is extended or adjusted under 35 U.S.C. 154(b) by 173 days.

(21) Appl. No.: 17/778,671

(22) PCT Filed: Jul. 24, 2020

(86) PCT No.: PCT/CN2020/104005
§ 371 (c)(1),
(2) Date: May 20, 2022

(87) PCT Pub. No.: WO2021/098268
PCT Pub. Date: May 27, 2021

(65) Prior Publication Data
US 2022/0413733 A1 Dec. 29, 2022

(30) Foreign Application Priority Data
Nov. 22, 2019 (CN) .......................... 201911157782.9

(51) Int. Cl.
*G06F 3/06* (2006.01)
(52) U.S. Cl.
CPC .......... *G06F 3/0647* (2013.01); *G06F 3/0635* (2013.01); *G06F 3/0679* (2013.01); *G06F 3/0604* (2013.01)
(58) Field of Classification Search
CPC .... G06F 3/0647; G06F 3/0635; G06F 3/0679; G06F 3/0604
(Continued)

(56) References Cited

U.S. PATENT DOCUMENTS

| 10,402,266 B1* | 9/2019 | Kirkpatrick ............ G11C 29/52 |
| 2007/0022129 A1* | 1/2007 | Bahar .................... G06F 9/5011 |
| 2020/0034167 A1* | 1/2020 | Parthasarathy ..... G06F 9/45558 |

FOREIGN PATENT DOCUMENTS

| CN | 107656705 A | 2/2018 |
| CN | 107728950 A | 2/2018 |

(Continued)

OTHER PUBLICATIONS

International Search Report dated Oct. 29, 2020; International Application No. PCT/CN2020/104005.

*Primary Examiner* — Gautam Sain
(74) *Attorney, Agent, or Firm* — DINSMORE & SHOHL LLP

(57) ABSTRACT

A MON service migration method, apparatus, and device, and a readable storage medium, for use in any node in a distributed storage system. The method comprises: acquiring historical data of a MON service in a current node; in the node, determining a target magnetic disk for migrating the MON service, and migrating the historical data to the target magnetic disk; creating mount information of the MON service in a configuration file of the distributed storage system; and restarting the MON service according to the configuration file, such that the MON service migrates to the target magnetic disk. The present method does not need to remove nodes in the distributed storage system, and therefore the MON service migration process will not affect front-end services, improving the service capabilities and reliability of the distributed storage system.

10 Claims, 3 Drawing Sheets

(58) Field of Classification Search
USPC .......................................................... 711/154
See application file for complete search history.

(56) References Cited

FOREIGN PATENT DOCUMENTS

| | | | |
|---|---|---|---|
| CN | 110019123 | A | 7/2019 |
| CN | 110399356 | A | 11/2019 |
| CN | 110989929 | A | 4/2020 |
| WO | 2018177107 | A1 | 10/2018 |

* cited by examiner

MON SERVICE MIGRATION METHOD, APPARATUS, AND DEVICE, AND READABLE STORAGE MEDIUM

CROSS REFERENCE TO RELATED APPLICATIONS

The application is the U.S. National Stage of PCT/CN2020/104005 filed on Jul. 24, 2020, which claims priority to Chinese Patent Application No. 201911157782.9, filed on Nov. 22, 2019, the entire content of both is incorporated herein by reference in its their entirety.

FIELD OF THE INVENTION

The application relates to the field of computer technologies, and particularly relates to a MON service migration method, apparatus, and device, and a readable storage medium.

BACKGROUND OF THE INVENTION

When a distributed storage system is deployed, a MON service is deployed on each node in the distributed storage system. The MON service in each node is mounted on a fixed magnetic disk in the node. The MON service is a monitor service.

At present, when a magnetic disk for mounting a MON service in a node fails or is fully written, the node needs to be removed from the distributed storage system and then accesses the distributed storage system as a new node, and the mount magnetic disk of the MON service in the node is changed during the access, so that migration of the MON service in the node is completed. It can be seen that in the prior art, the node needs to be removed from the distributed storage system to migrate the MON service. The removal of the node has an impact on a loading capability of the entire distributed storage system and has a greater impact on front-end services when the system is busy, as a result, the service capability and reliability of the distributed storage system are reduced.

Therefore, how to migrate a MON service in a node without affecting the front-end services is a problem that needs to be solved by those skilled in the art.

SUMMARY OF THE INVENTION

In view of this, an objective of the application is to provide a MON service migration method, apparatus, and device, and a readable storage medium, so as to migrate a MON service in a node without affecting front-end services. Specific solutions of the application are as follows.

According to a first aspect, the application provides a MON service migration method, for use in any node in a distributed storage system, including:
acquiring historical data of a MON service in a current node;
determining, in the node, a target magnetic disk for migrating the MON service, and migrating the historical data to the target magnetic disk;
creating mount information of the MON service in a configuration file of the distributed storage system, wherein the mount information includes: a name of the node, a name of the MON service, and a partition path of the target magnetic disk in the distributed storage system; and
restarting the MON service according to the configuration file, such that the MON service is migrated to the target magnetic disk.

Preferably, determining, in the node, the target magnetic disk for migrating the MON service includes:
querying mountable magnetic disks in the node by using a lsblk command; and
if an SSD exists in the mountable magnetic disks, determining the SSD in the mountable magnetic disks to be the target magnetic disk.

Preferably, the method further includes:
if no SSD exists in the mountable magnetic disks, randomly selecting a target magnetic disk in the mountable magnetic disks.

Preferably, restarting the MON service according to the configuration file includes:
reading the mount information, and restarting the MON service according to the mount information.

Preferably, before creating the mount information of the MON service in the configuration file of the distributed storage system, the method further includes:
deleting original mount information of the MON service in the configuration file, wherein the original mount information includes: a name of the node, a name of the MON service, and a partition path of an original mount magnetic disk of the MON service in the distributed storage system.

Preferably, after restarting the MON service according to the configuration file, such that the MON service is migrated to the target magnetic disk, the method further includes:
visually displaying monitor information in the target magnetic disk.

According to a second aspect, the application provides a MON service migration apparatus, for use in any node in a distributed storage system, including:
an acquisition module, configured to acquire historical data of a MON service in a current node;
an execution module, configured to determine, in the node, a target magnetic disk for migrating the MON service, and migrate the historical data to the target magnetic disk;
a creation module, configured to create mount information of the MON service in a configuration file of the distributed storage system, wherein the mount information includes: a name of the node, a name of the MON service, and a partition path of the target magnetic disk in the distributed storage system; and
a restarting module, configured to restart the MON service according to the configuration file, so as to migrate the MON service to the target magnetic disk.

Preferably, the execution module includes:
a querying unit, configured to query mountable magnetic disks in the node by using a lsblk command; and
a determining unit, configured to, if an SSD exists in the mountable magnetic disks, determine the SSD in the mountable magnetic disks to be the target magnetic disk.

According to a third aspect, the application provides a MON service migration device, including:
a memory, configured to store a computer program; and
a processor, configured to execute the computer program to implement the MON service migration method disclosed above.

According to a fourth aspect, the application provides a readable storage medium for storing a computer program, wherein the computer program, when executed by a processor, implements the MON service migration method disclosed above.

It can be learned from the above solutions that, the application provides a MON service migration method, for use in any node in the distributed storage system. The method includes: acquiring the historical data of the MON service in the current node; determining, in the node, the target magnetic disk for migrating the MON service, and migrating the historical data to the target magnetic disk; creating the mount information of the MON service in the configuration file of the distributed storage system, wherein the mount information includes: the name of the node, the name of the MON service, and the partition path of the target magnetic disk in the distributed storage system; and restarting the MON service according to the configuration file, such that the MON service is migrated to the target magnetic disk.

It can be seen that according to the method, the node in the distributed storage system does not need to be removed, and only the historical data of the MON service in the node needs to be migrated to the new target magnetic disk, the mount information of the MON service is recreated in the configuration file of the distributed storage system, and then the MON service is restarted according to the configuration file, such that the MON service can be migrated from the original magnetic disk to the target magnetic disk, that is, the target magnetic disk is changed into a mount magnetic disk of the MON service in the current node. In the application, the node in the distributed storage system does not need to be removed, and therefore the MON service migration process cannot affect front-end services and cannot reduce a loading capability of the distributed storage system, improving the service capability and reliability of the distributed storage system.

Correspondingly, the MON service migration apparatus and device, and the readable storage medium provided in the application also have the above technical effects.

BRIEF DESCRIPTION OF THE DRAWINGS

To describe the technical solutions in the embodiments of the application or in the prior art more clearly, the accompanying drawings required for describing the embodiments or the prior art will be described below briefly. Apparently, the accompanying drawings in the following description merely show some embodiments of the application, and those of ordinary skill in the art may still derive other accompanying drawings in accordance with the provided accompanying drawings without creative efforts.

DETAILED DESCRIPTION OF THE INVENTION

The technical solutions in the embodiments of the application will be clearly and completely described below with reference to the accompanying drawings in the embodiments of the application. Apparently, the described embodiments are merely some rather than all embodiments of the application. All other embodiments obtained by those of ordinary skill in the art based on the embodiments of the application without creative efforts shall fall within the protection scope of the application.

At present, in the prior art, the node needs to be removed from the distributed storage system to migrate the MON service. The removal of the node has an impact on a loading capability of the entire distributed storage system and has a greater impact on front-end services when the system is busy, as a result, the service capability and reliability of the distributed storage system are reduced. Therefore, the application provides a MON service migration solution to migrate a MON service in a node without affecting the front-end services.

Figure 1:
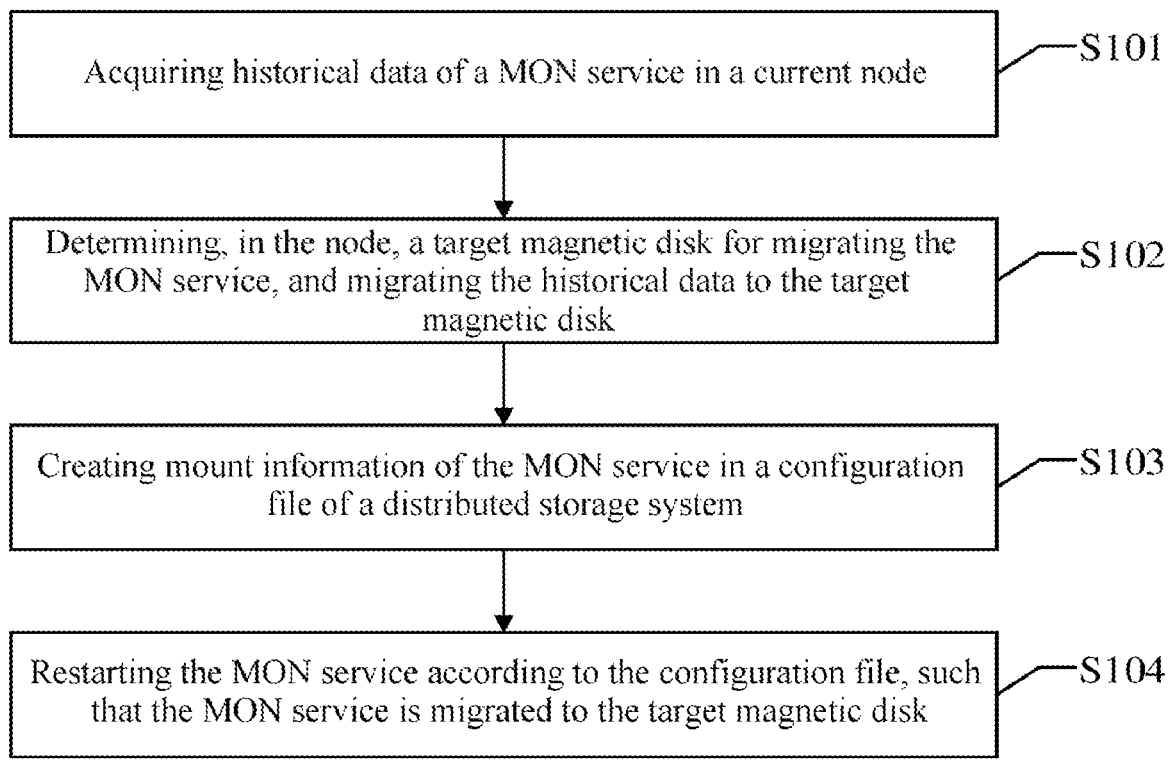
FIG. 1 is a flow chart of a first MON service migration method of the application.

Referring to FIG. 1, an embodiment of the application discloses a first MON service migration method, for use in any node in a distributed storage system, including the following steps.

S101: historical data of a MON service in a current node is acquired.

S102: a target magnetic disk for migrating the MON service in the node is determined, and the historical data is migrated to the target magnetic disk.

In a specific embodiment, before mount information of the MON service is created in a configuration file of a distributed storage system, the method further includes the step that original mount information of the MON service in the configuration file is deleted, wherein the original mount information includes: a name of the node, a name of the MON service, and a partition path of an original mount magnetic disk of the MON service in the distributed storage system.

Specifically, before the mount information of the MON service is created, the original mount information of the MON service is deleted, thereby avoiding a MON service migration failure caused by repetition of the mount information.

S103: mount information of the MON service is created in a configuration file of a distributed storage system.

The mount information includes: a name of the node, a name of the MON service, and a partition path of the target magnetic disk in the distributed storage system. The name of the node may be unique identification information such as a node ID and an IP address.

S104: the MON service is restarted according to the configuration file, such that the MON service is migrated to the target magnetic disk.

In a specific embodiment, the step that the MON service is restarted according to the configuration file includes: reading the mount information, and restarting the MON service according to the mount information.

It can be seen that according to the embodiment of the application, the node in the distributed storage system does not need to removed, only the historical data of the MON service in the node needs to be migrated to the new target magnetic disk, the mount information of the MON service is recreated in the configuration file of the distributed storage system, and then the MON service is restarted according to the configuration file, such that the MON service can be migrated from the original magnetic disk to the target magnetic disk, that is, the target magnetic disk is changed into a mount magnetic disk of the MON service in the current node. In The application, the node in the distributed storage system does not need to be removed, and therefore the MON service migration process cannot affect the front-end services and cannot reduce a loading capability of the distributed storage system, improving the service capability and reliability of the distributed storage system.

Figure 2:
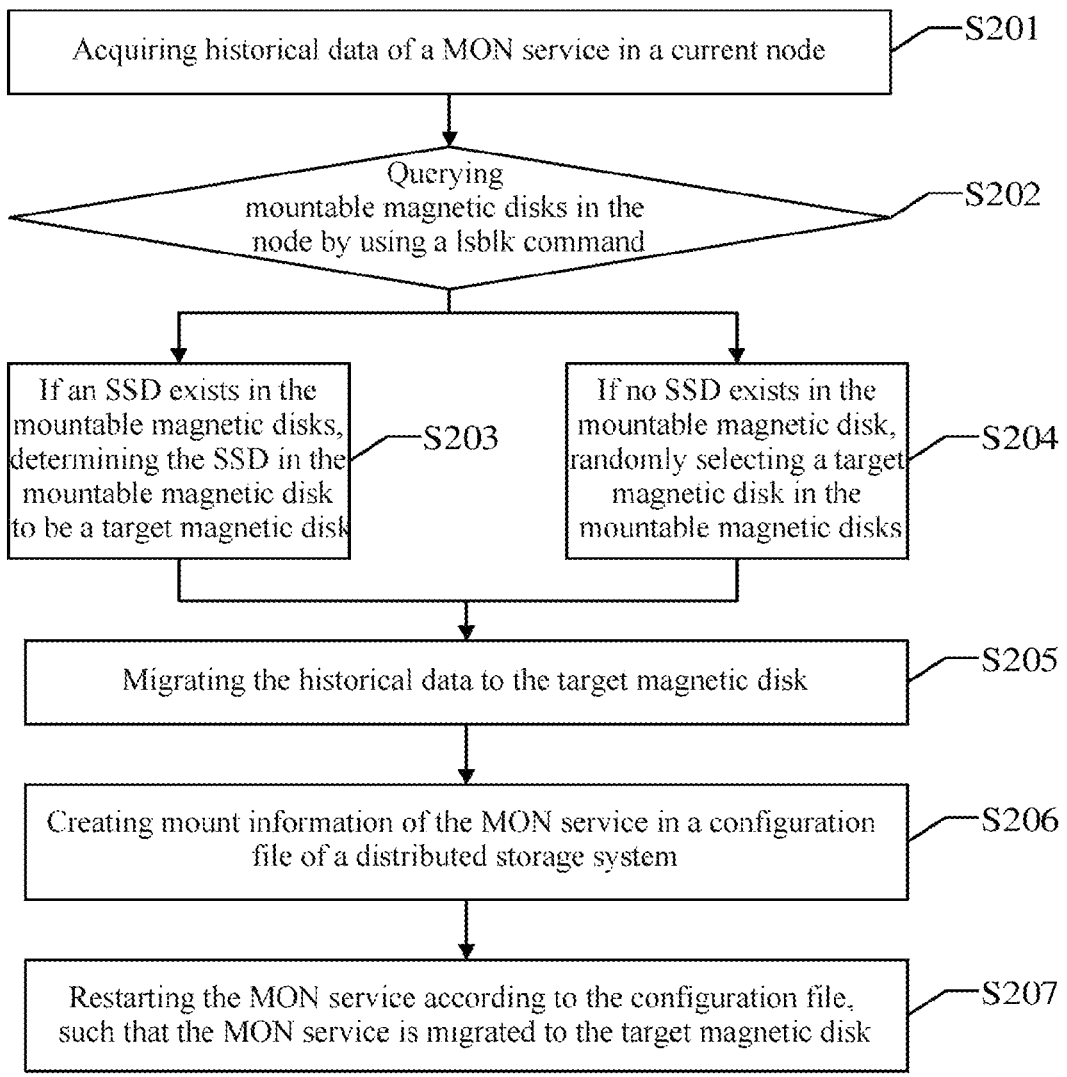
FIG. 2 is a flow chart of a second MON service migration method of the application.

It should be noted that if the MON service is expected to be mounted on a magnetic disk (such as an SSD) with better performance, the MON service can be migrated according to the method provided in the application, thereby improving the capability of the MON service. Referring to FIG. 2, an embodiment of the application discloses a second MON service migration method, for use in any node in a distributed storage system, including:

S201: acquiring historical data of a MON service in a current node;

S202: querying mountable magnetic disks in the node by using a lsblk command;

S203: if an SSD exists in the mountable magnetic disks, determining the SSD in the mountable magnetic disks to be a target magnetic disk, and performing S205;

S204: if no SSD exists in the mountable magnetic disks, randomly selecting a target magnetic disk in the mountable magnetic disks, and performing S205, wherein a randomized algorithm can be applied when the target magnetic disk is randomly selected;

S205: migrating the historical data to the target magnetic disk;

S206: creating mount information of the MON service in a configuration file of the distributed storage system, wherein the mount information includes: a name of the node, a name of the MON service, and a partition path of the target magnetic disk in the distributed storage system; and S207: restarting the MON service according to the configuration file, such that the MON service is migrated to the target magnetic disk.

In a specific embodiment, after restarting the MON service according to the configuration file, such that the MON service is migrated to the target magnetic disk, the method further includes: visually displaying monitor information in the target magnetic disk. After a migration process of the MON service is completed, the monitor information of the target magnetic disk can be displayed, and therefore a user can conveniently query the monitor information.

It should be noted that other implementation steps in the embodiment are the same as or similar to those in the above embodiment, which are not described in detail here in the embodiment.

It can be learned that according to the embodiment, the node in the distributed storage system does not need to be removed, and only the historical data of the MON service in the node needs to be migrated to the new target magnetic disk, the mount information of the MON service is recreated in the configuration file of the distributed storage system, and then the MON service is restarted according to the configuration file, such that the MON service can be migrated from the original magnetic disk to the target magnetic disk, that is, the target magnetic disk is changed into a mount magnetic disk of the MON service in the current node. In the application, the node in the distributed storage system does not need to removed, and therefore the MON service migration process cannot affect front-end services and cannot reduce a loading capability of the distributed storage system, improving the service capability and reliability of the distributed storage system.

The following MON service migration embodiment can be implemented according to the method provided in the application. The specific implementation process is as follows.

1. A target magnetic disk for mounting a MON service in any node is determined in a distributed storage system, and a partition path of the magnetic disk in the distributed storage system is acquired by using a lsblk command.

2. A MON service in a current node is disabled.

3. Historical data of the MON service is copied into the target magnetic disk, and the partition path of the target magnetic disk in the distributed storage system, a name of the current node, and a name of the MON service are written into a cluster configuration file of the distributed storage system.

4. The MON service in the current node is enabled.

It should be noted that the MON service in any node in the distributed storage system can be migrated according to the above steps 1 to 4, elimination of a MON service operation failure or improvement to a MON service capability can be implemented without affecting front-end services, thereby improving a comprehensive operation capability and an anti-risk capability of the distributed storage system.

The following describes a MON service migration apparatus provided in the embodiment of the application. The following descriptions of the MON service migration apparatus and the foregoing descriptions of the MON service migration method may make reference to each other.

Figure 3:
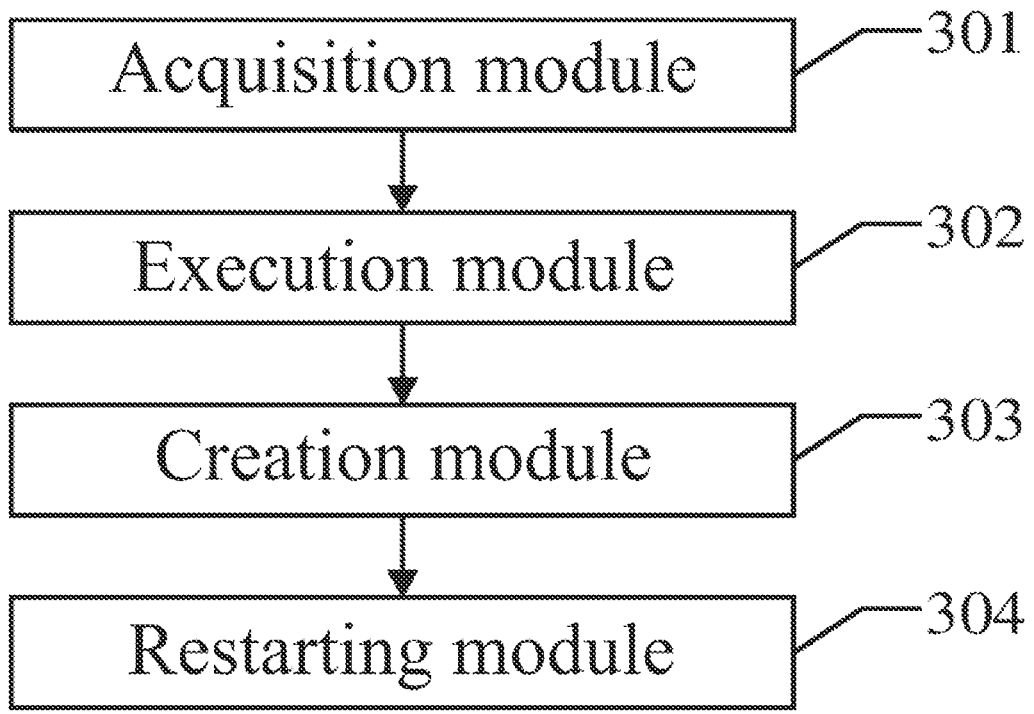
FIG. 3 is a schematic diagram of a MON service migration apparatus of the application.

Referring to FIG. 3, an embodiment of the application discloses a MON service migration apparatus, for use in any node in a distributed storage system, including:

an acquisition module 301, configured to acquire historical data of a MON service in a current node;

an execution module 302, configured to determine, in the node, a target magnetic disk for migrating the MON service, and migrate the historical data to the target magnetic disk;

a creation module 303, configured to create mount information of the MON service in a configuration file of the distributed storage system, wherein the mount information includes: a name of the node, a name of the MON service, and a partition path of the target magnetic disk in the distributed storage system; and a restarting module 304, configured to restart the MON service according to the configuration file, so as to migrate the MON service to the target magnetic disk.

In a specific embodiment, the execution module includes:

a querying unit, configured to query mountable magnetic disks in the node by using a lsblk command; and a determining unit, configured to, if an SSD exists in the mountable magnetic disks, determine the SSD in the mountable magnetic disks to be the target magnetic disk.

In a specific embodiment, the execution module further includes:

a selection unit, configured to, if no SSD exists in the mountable magnetic disks, randomly select a target magnetic disk in the mountable magnetic disks.

In a specific embodiment, the restarting module is specifically configured to:

read the mount information, and restart the MON service according to the mount information.

In a specific embodiment, the apparatus further includes:

a deletion module, configured to delete original mount information of the MON service in the configuration file, wherein the original mount information includes: a name of the node, a name of the MON service, and a partition path of an original mount magnetic disk of the MON service in the distributed storage system.

In a specific embodiment, the apparatus further includes:

a displaying module, configured to visually display monitor information in the target magnetic disk.

For a more detailed operating process of modules and units in the embodiment, reference may be made to corresponding content in the foregoing embodiment, which is not described in detail here.

It can be learned that the MON service migration apparatus provided in the embodiment of the application does not need to remove nodes in the distributed storage system, and therefore the MON service migration process cannot affect front-end services and cannot reduce a loading capability of the distributed storage system, improving the service capability and reliability of the distributed storage system.

The following describes a MON service migration device provided in this embodiment of this application. The following descriptions of the MON service migration device and the foregoing descriptions of the MON service migration method may make reference to each other.

Figure 4:
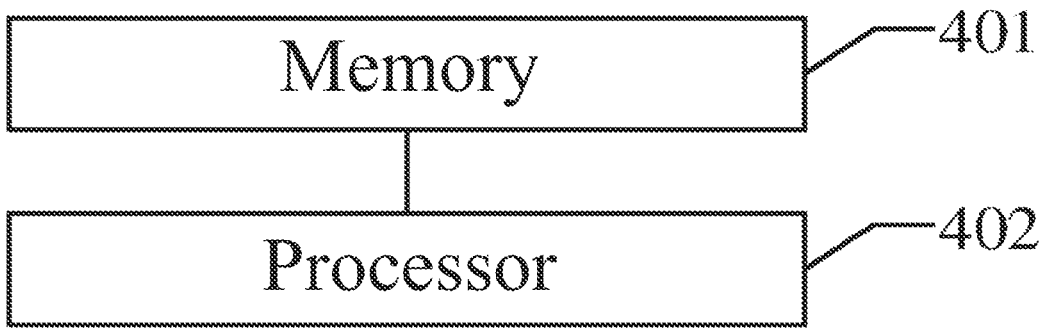
FIG. 4 is a schematic diagram of a MON service migration device of the application.

Referring to FIG. 4, an embodiment of the application discloses a MON service migration device, including:

a memory 401, configured to store a computer program; and a processor 402, configured to execute the computer program to implement the method disclosed in any above embodiment.

The following describes a readable storage medium provided in the embodiment of the application. The following descriptions of the readable storage medium and the foregoing descriptions of the MON service migration method, apparatus, and device may make reference to each other.

The readable storage medium is configured to store the computer program. The computer program, when executed by a processor, implements the MON service migration method disclosed in the foregoing embodiment. Specific steps of the method may refer to corresponding content in the foregoing embodiment, which are not described in detail here.

The terms "first", "second", "third", "fourth", and the like (if exist) in the application are used to distinguish similar objects instead of describing a specific order or sequence. It should be understood that the data used in this way is interchangeable in appropriate circumstances, so that the embodiments described here can be implemented in other orders than the order illustrated or described here. In addition, the terms "include", "have", and any other variants thereof are intended to cover a non-exclusive inclusion. For example, a process, method, or device that includes a list of steps or units is not necessarily limited to those steps or units that are expressly listed, but may include other steps or units that are not expressly listed or are inherent to the process, method, or device.

It should be noted that the terms "first", "second", and the like in the application are merely used for description and cannot be construed as indicating or implying relative importance or implicitly indicating the number of the technical features indicated. Therefore, the features defined by "first" and "second" can expressly or implicitly include at least one such feature. In addition, the technical solutions of the embodiments can be combined with each other and need to be based on being implementable by those of ordinary skill in the art. When a combination of the technical solutions appears to be contradictory or cannot be realized, it should be appreciated that this combination of the technical solutions does not exist and is not within the protection scope of claims of this application.

The embodiments in the specification are described in a progressive manner, each embodiment focuses on the difference from other embodiments, and the same and similar parts between the embodiments may refer to each other.

The steps of the method or an algorithm described in the embodiments in the specification can be directly implemented by hardware, a software module executed by a processor, or a combination of the hardware and the software module. The software module may be located in a random access memory (RAM), a memory, a read-only memory (ROM), an electrically programmable ROM, an electrically erasable programmable ROM, a register, a hard disk, a mobile disk, a CD-ROM, or any other form of readable storage medium well known in the technical field.

Specific examples are used herein for illustration of the principles and implementations of the present application. The description of the embodiments above is used to help understand the method of the present application and the core idea thereof. Meanwhile, those of ordinary skill in the art can make changes to specific implementations and scope of application in accordance with the idea of the present application. In conclusion, the content of the specification should not be construed as a limitation on the present application.

What is claimed is:

1. A monitoring service migration method, for use in any node in a distributed storage system, comprising:
   acquiring historical data of a monitoring service in a current node;
   determining, in the node, a target magnetic disk for migrating the monitoring service, and migrating the historical data to the target magnetic disk;
   deleting original mount information of the MON service in a configuration file of the distributed storage system, the original mount information including a name of the node, a name of the monitoring service, and a partition path of an original mount magnetic disk of the monitoring service in the distributed storage system;
   creating mount information of the monitoring service in the configuration file of the distributed storage system, wherein the mount information comprises: a name of the node, a name of the monitoring service, and a partition path of the target magnetic disk in the distributed storage system; and
   restarting the monitoring service according to the configuration file, such that the monitoring service is migrated to the target magnetic disk.

2. The monitoring service migration method according to claim 1, wherein determining, in the node, the target magnetic disk for migrating the monitoring service comprises:
   querying mountable magnetic disks in the node by using a query command; and
   under the condition that a solid state disk exists in the mountable magnetic disks, determining the solid state disk in the mountable magnetic disks to be the target magnetic disk.

3. The monitoring service migration method according to claim 2, further comprising:
   under the condition that no solid state disk exists in the mountable magnetic disks, randomly selecting the target magnetic disk in the mountable magnetic disks.

4. The monitoring service migration method according to claim 3, wherein after restarting the monitoring service according to the configuration file, such that the monitoring service is migrated to the target magnetic disk, the method further comprises:
   visually displaying monitor information in the target magnetic disk.

5. The monitoring service migration method according to claim 2, wherein after restarting the monitoring service according to the configuration file, such that the monitoring service is migrated to the target magnetic disk, the method further comprises:

visually displaying monitor information in the target magnetic disk.

6. The monitoring service migration method according to claim 1, wherein restarting the MON service according to the configuration file comprises:

reading the mount information, and restarting the monitoring service according to the mount information, wherein a randomized algorithm is applied when the target magnetic disk is randomly selected.

7. The monitoring service migration method according to claim 6, wherein after restarting the monitoring service according to the configuration file, such that the monitoring service is migrated to the target magnetic disk, the method further comprises:

visually displaying monitor information in the target magnetic disk.

8. The monitoring service migration method according to claim 1, wherein after restarting the MON service according to the configuration file, such that the monitoring service is migrated to the target magnetic disk, the method further comprises:

visually displaying monitor information in the target magnetic disk.

9. A monitoring service migration device, comprising:
a non-transitory memory, configured to store a computer program; and
a processor, configured to execute the computer program to implement the monitoring service migration method according to claim 1.

10. A non-transitory readable storage medium for storing a computer program, wherein the computer program, when executed by a processor, implements the monitoring service migration method according to claim 1.

* * * * *